United States Patent [19]

Silverman

[11] Patent Number: 4,479,204
[45] Date of Patent: Oct. 23, 1984

[54] METHOD OF MONITORING THE SPACIAL PRODUCTION OF HYDROCARBONS FROM A PETROLEUM RESERVOIR

[76] Inventor: Daniel Silverman, 5969 S. Birmingham St., Tulsa, Okla. 74105

[21] Appl. No.: 268,787

[22] Filed: Jun. 1, 1981

Related U.S. Application Data

[63] Continuation-in-part of Ser. No. 41,061, May 21, 1979, Pat. No. 4,282,587.

[51] Int. Cl.³ .............................................. G01V 1/135
[52] U.S. Cl. ........................................ 367/47; 367/29; 367/48; 73/589
[58] Field of Search .................... 367/21, 29, 47, 48; 181/108, 112; 73/589, 592, 598

[56] References Cited

U.S. PATENT DOCUMENTS

| | | | |
|---|---|---|---|
| 3,739,871 | 6/1973 | Bailey | 367/37 |
| 3,805,587 | 4/1974 | Sayer | 367/37 |
| 3,921,126 | 11/1975 | Waters | 367/47 |
| 4,280,200 | 7/1981 | Silverman | 367/37 |
| 4,282,587 | 8/1981 | Silverman | 367/37 |

OTHER PUBLICATIONS

Schuster, C., "Detectors Within . . . Facturing", 10/3/68, 53rd Ann. SPE. of AIME, pp. 7448–7456.
Shuck et al, "Monitoring Acoustic Emission . . . Rocks," 6/11/75, Conf. Acoust. Emission, pp 1–41.
Savit, "Bright Spot in the Energy Picture", 2/74, pp. 60–65, Ocean Industry.
Pan et al, "Direct Location . . . Reflection Method", Geophysics, 1971.
Ritch et al, "Evidence . . . Bright Spot Sands", 6/12/76, pp. 1–11, SPWLA 17th Ann. Log. Symp.

*Primary Examiner*—Nelson Moskowitz

[57] ABSTRACT

In the injection of fluids into subsurface geological formations, such as for the purpose of recovering a mineral in that formation, it is important that the flow progress of that fluid is known at all points in the subsurface. This information is provided by injecting a selected fluid into the formation. This fluid may be a gas, or a liquid, or a mixture of gas and liquid. When this fluid is in the subsurface formation there will be a mixture of gas and liquid in selected proportion in the formation. This mixture in a geologic formation overlain by a shale, for example, will have a much higher reflection coefficient. A source of seismic waves is operated at the surface, and the received reflections are compared between spaced positions on the surface.

28 Claims, 3 Drawing Figures

METHOD OF MONITORING THE SPACIAL PRODUCTION OF HYDROCARBONS FROM A PETROLEUM RESERVOIR

CROSS-REFERENCE TO RELATED APPLICATION

This application is a continuation-in-part of my copending application, Ser. No. 41,061, entitled: "THE METHOD OF MONITORING THE RECOVERY OF MINERALS FROM SHALLOW GEOLOGIC FORMATIONS". Ser. No. 41,061, May 21, 1979, now U.S. Pat. No. 4,282,587, is entered by reference into this application.

This application is also related to my copending application, Ser. No. 226,891, entitled: "METHOD AND APPARATUS FOR FRACTURING A DEEP BOREHOLE AND DETERMINING THE FRACTURE AZIMUTH."

BACKGROUND OF THE INVENTION

1. Field of the Invention

This invention lies in the field of the production of petroleum, gas, viscous oils, tar, sulfur and other minerals from geologic formations by special recovery means.

More particularly, the invention is concerned with the recovery of minerals, such as hydrocarbons, from geologic formations containing very viscous hydrocarbons, by heating the formations, such as by burning part of the hydrocarbons, by injecting pressurized air and igniting the hydrocarbons or by injecting high pressure steam.

Still more particularly, this invention is concerned with the mapping of the subsurface formations as the hydrocarbons are progressively removed from the formation by flowing a recovery fluid through the formation.

Still more particularly this invention is concerned with mapping the flow of the injected fluids as the recovery process progresses, by the use of a seismic source at the surface above the area of recovery and detecting the character of the reflections received at a plurality of points, where the selected fluid injected into the formation is designed to change the reflection coefficient at the top interface of the formation.

2. Background of the Invention

Recent work in seismic prospecting has involved improved methods of analyzing field records of reflections received from reflection at the top of certain formations where there is a condition of gas saturated liquids in the pores of the formation. This situation is conventionally known as "bright spot". So far this has only been applied to the recognition of locations in the earth where this condition pre-exists.

My invention involves the step or steps of injecting a selected fluid into a formation to create this condition, where it did not exist before, so as to make visible by seismic waves the presence, in certain locations in the formation, where such "bright spot" conditions had been generated.

SUMMARY OF THE INVENTION

The principal object of this invention is to determine the shape and size of the area of a zone in a geological formation, from which hydrocarbons and other minerals have been removed, as a mineral recovery program processes, under various conditions, such as with and without a fracture.

These and other objects are realized and the limitations of the prior art are overcome in this invention by positioning a source of seismic waves, which can produce compressional waves, or shear waves, and can be impulsive or vibratory, as is well known in the art, at or near the surface of the earth, at a selected point, over the expected position of the hydrocarbon recovery operation. A plurality of seismic sensors are positioned at or near the surface of the earth in known positions. The array is preferably colinear with the source, and should extend far enough, such that the point of reflection of the seismic waves from the source to a reflecting interface at or near the depth of the selected geological formation containing the minerals and to the sensors will be a greater radius from the well bore than the outer perimeter of the area from which the mineral is to be removed.

Thus, of all the reflecting points to each of the sensors, some will be within, and some will be outside of this outer perimeter.

This source is energized in at least two conditions. A first condition B exists before the recovery operation is initiated. The second condition A exists after the recovery operation has progressed to the point where a detectable volume of the formation has been cleared of at least part of the mineral originally present.

Considerable work has been done on the recovery of tar or heavy hydrocarbons from shallow formations by starting with a borehole drilled to the tar sand, forming a horizontal fracture in the formation, drilling a second production well to the fracture spaced from said borehole, forcing pressurized air into the borehole and igniting the tar, and burning part of the tar or hydrocarbons to heat the formation, so that the hydrocarbons will soften and become free-flowing liquid, and flow through the fracture to the secondary borehole or producing well, and be recovered at the surface.

However, I am not aware of any satisfactory method of mapping the progress of the burn front, to determine the area of the portion of the reservoir from which the hydrocarbon has been recovered, or whether part of the reservoir is being bypassed by the burn front, and so on.

This invention is related to that problem and is applicable to tar sands and hydrocarbon recovery by pressurizing with air and burning, or recovery by heating with high pressure steam. The invention is related also to the recovery of heavy (viscous) oil in the pores of consolidated porous rocks, by heating and/or burning, both with and without the presence of a fracture. It is also applicable to the recovevery of other minerals by solution, or chemical exolution, such as sulphur, salt, copper and so on.

It is therefore a still further object of this invention, when the fracture is in a tar sand, for example, and the hydrocarbon is removed by heating the formation, such as by injecting steam into the fracture, or by injecting air under pressure and burning at least part of the hydrocarbons in the formation, to determine, at any selected time after the start of heating, the shape and size of the area of the formation from which the hydrocarbon has been at least partially removed.

BRIEF DESCRIPTION OF THE DRAWINGS

These and other objects and advantages, and a better understanding of the principles and details of the invention will be evident from the following description, taken in conjunction with the appended drawings, in which.

DESCRIPTION OF THE PREFERRED EMBODIMENT

The operation of the method of this invention will be better understood by reviewing briefly the principles of the transmission and reflection of seismic waves at geologic interfaces in the earth.

Figure 1:
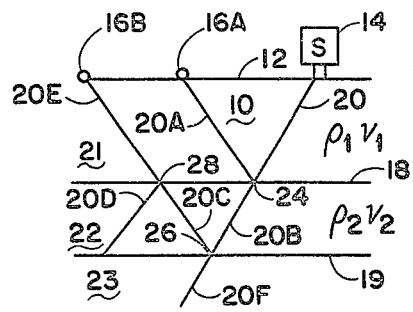
FIG. 1 is a prior art figure representing the transmission and reflection of seismic waves at geologic interfaces.

Referring to FIG. 1, which is fully taught in most textbooks on the seismic process of geophysical prospecting, the earth 10, having a surface 12, is shown having three geologic formations 21 at the surface, 22 below the formation 21, with an intervening contact or interface 18, and a third formation 23 in contact with 22, at an interface 19.

A seismic source 14 is set up at the surface, and a plurality of sensors, such as geophones 16A, 16B, etc., spaced from the source 14. By conventional representation, a ray of seismic energy 20 passes downwardly to reflection point 24 at the interface 18, where generally part of the energy is transmitted across the interface 18 as ray 20B, and part is reflected, as upwardly reflected ray 20A.

Again, at interface 19, part of the energy of ray 20B is transmitted at reflection point 26 across the interface 19 as ray 20F, and part is reflected upwardly as ray 20C.

Part of the upwardly travelling ray 20C at reflection point 28 is transmitted across the interface 18, from below as the ray 20E, and part is reflected downwardly as ray 20D, and so on.

There are several relationships that are well known. First, at the reflection point 24, for example, the angles of incidence and reflection, are equal. This occurs at all reflection points, such as 24, 26, 28, and so on. Second, the division of energy as between the incident wave and the reflected wave is given by the relation $$R = (AR/AI) = (\rho_2 V_2 - \rho_1 V_1)/(\rho_2 V_2 + \rho_1 V_1) \quad (1)$$

where

R is the reflection coefficient, or the ratio between the energy of the reflected wave, to the incident wave.

AR is the energy of the reflected wave.

AI is the energy of the incident wave.

$\rho_1$ is the density of the formation 1 from which the wave is incident.

$\rho_2$ is the density of the formation 2, into which the wave is transmitted.

$V_1$ is the velocity of seismic wave transmission in formation 1.

$V_2$ is the velocity of seismic wave transmission in formation 2.

Of course, the energy of the transmitted wave in formation 2 is given by $$AT = AI - AR.$$

The quantity $\rho V$ is called the acoustic impedance of a selected geologic formation. Such formations in the earth have independent densities and velocities. Thus two different formations may have the same acoustic impedance, yet be considerably different in $\rho$ and/or V, and vice versa.

The reflection coefficients R are generally small, thus sufficient energy is present in deep reflections, after having been traversing many hundreds or thousands of geologic interfaces, to be detectable.

However, where the reflection takes place between a rock and a liquid, because of the disparity in density and velocity and reflection coefficient can be quite large. Also where the interface is between rock and air, such as at the surface of the earth, the reflection coefficient can be almost 100 percent.

Also, there may be considerable change in phase differences between the incident and the reflected waves. So, comparison of the amplitudes and phase changes can be important in defining the reflection.

In equation 1, the seismic velocity is a complex function of a number of rock physical and elastic properties, such as porosity cementation, type of fluid saturation, density, and compressibility of the fluid, and so on. If the pores are filled with a liquid, such as water or gas, the velocity is a simpler function than where gas is present in the pores, either alone, or as partial saturation in the liquid or liquids.

Because of the great compressibility of the gas when present in the liquid, it provides a combination fluid of high compressibility. This is the case, even for a small percentage of gas. Thus, as little as 5% saturation, or less, of gas in water or oil, can increase the compressibility to the point where the acoustic impedance of the rock is greatly lowered.

For example, with an unconsolidated sand below a shale (shale is substantially impervious to gas), quite a small saturation of gas (say 5% or less) in oil in water in the pores can increase the reflection coefficient from a low value to a much higher value. Thus such a lithological condition that might not produce a recognizable reflection, with a small amount of gas, can produce a very large reflection.

In this invention I have made use of these principles in mapping the extent to which a fluid injected into a subsurface porous geologic formation has progressed from the injection well, into the surrounding formation.

There are a number of cases where this technique can be used, such as when:

(A) a gas is injected into the pores as a pusher fluid to maintain a pressure on the oil (for example) to force it to producing wells. This would cover the cases where the injected fluid is a hydrocarbon gas, or a foam, or a gas such as carbon dioxide gas, etc.;

(B) or the case where water is injected into an oil producing formation as a driving fluid. In this case I propose to inject gas into the water stream, to provide the partial gas saturation;

(C) or the injection of steam into a viscous oil formation to apply heat to the rock to reduce the viscosity of the oil and to force it to a producing well, or permit it to flow back to the injection well, as in the so-called "huff and puff" method of producing heavy oil from pores in a competent rock;

In these conditions the formations can be shallow, and may include a shallow horizontal fracture, or they can be, without a fracture, at any depth;

(D) or the case of the injection of a fracturing fluid of selected composition to provide a deep fracture. Here again, I propose to inject a gas into the fracture fluid, to (in a sense) make the fluid visible at the surface by means of seismic waves reflected from the formation containing the gas saturation;

(E) and then, of course, there is the general case of the shallow tar sands from which the tar is removed by heating the tar until it becomes fluid and can be produced. This will not be discussed in detail since it is fully described in my copending application, Ser. No. 41,061, which is entered by reference into this application.

However, it is well to emphasize again, that in the case of the injection of air into a tar sand and combustion of the tar, in the burn zone, the temperature is very high, the tar is flowable, and is mixed with water (either by injection, or as the product of combustion of hydrogen), and with the gaseous products of combustion. This condition provides the necessary liquid and gas saturation needed to make the compressibility high and produce a large reflection, whereas, at a greater radius from the injection well, the tar is still solid, and the reflection from the top surface is very small.

And, of course, where steam is used to heat the tar, as the steam heats the tar, it produces a mixture of liquid, tar, water and gas, which is the desired condition in the formation to provide a strong reflection.

Where the seismic source puts out a relatively simple wavelet, the "character" of the reflected seismic wave can be fairly simple. On the other hand, when the incident seismic wave is a long time function, as from a vibratory source, the "character" of the reflected wave can be very complex.

Also, where the seismic waves are shear waves which do not transmit through a liquid or gas, the reflected energy can be very large.

Thus, by making use of these principles and with the appropriate geometry and observing the character of the seismic waves and functions of their amplitude and phase, much information can be determined relating to the dimensions of the zone of the mineral containing formation from which at least part of the mineral has been provided.

Figure 2:
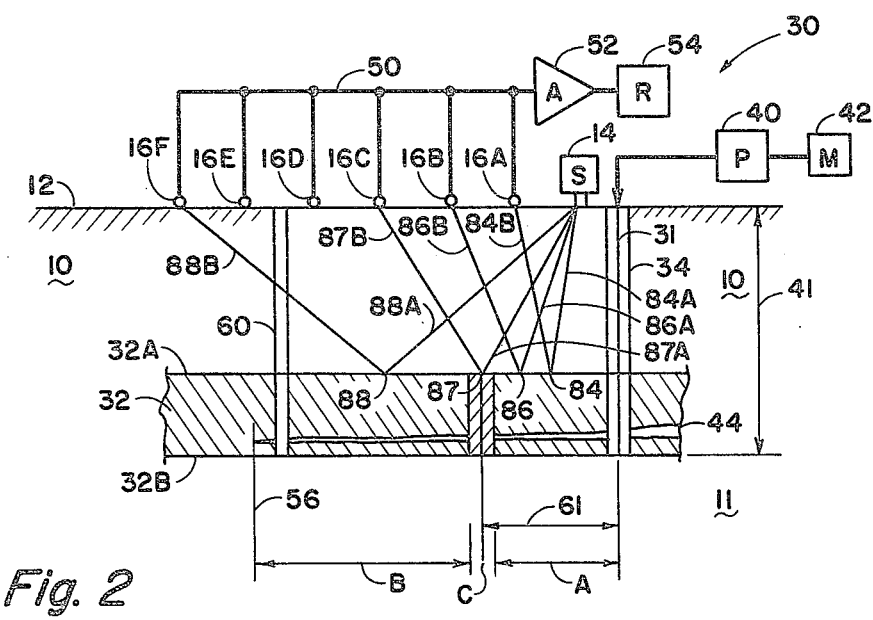
FIG. 2 illustrates schematically one embodiment of this invention.

Referring now to FIG. 2, there is shown schematically one embodiment of this invention, comprising a portion of the earth 10 including the surface 12. There is a borehole 34 drilled in conventional manner from the surface 12 to a depth 41 into a geologic formation 32. Such a formation may be, for example, a shallow formation which contains hydrocarbons in the form of tar or very heavy (viscous) oil. For the purpose of recovery of these hydrocarbons, a fracture 44 may be produced in the body of the formation 32, preferably near the bottom thereof. However, a fracture in the formation 32 is not necessary to this invention, and the invention can be practiced with or without one. The fracture is solely for the purpose of producing the mineral. If the fracture is provided, then it will be convenient to have one or more secondary boreholes for carrying to the surface the liquid mineral that flows outwardly through the fracture as the result of the pressure of the injected fluid.

In my copending application Ser. No. 41,061, I have fully described the case of a tar in an unconsolidated sand formation and the heating of the tar either by injecting an oxygen containing gas and burning the tar, or by injecting steam, and so on.

This invention extends some of the principles of Ser. No. 41,061 and adds new objects and principles. One application of these principles will be to those formations which have viscous hydrocarbons in the pores of a consolidated rock formation.

The formation 32 of FIG. 2 is such a formation. Two zones are indicated around the borehole, or well 34, by radii A and B, and there is a third narrow zone C at their contact. The inner zone A is marked with a different cross-hatching than zone B, and indicates a zone encircling the borehole 34, through which a selected fluid is injected into the formation. Zone A represents a zone in which at least part of the viscous oil has been converted to a liquid and been produced. Zone B represents the original state of the formation in which the hydrocarbon is essentially solid, rather than liquid. In Zone C there is a mixed situation, where part of the oil or tar is softening and part is a liquid, etc. In the case of a burning process for heating the formation, zone C would be called the "burn-zone"—in the case of steam heating, I will call it the "transition zone". In the general case, it will be called the "drive front".

At the surface I show a seismic source S,14 near the borehole 34. While this is a convenient location, it can be placed anywhere in the area of the zone to be produced. There are also an array of sensors or geophones 16A, 16B . . . 16F. While these are shown in a linear array, this is only for convenience. A two-dimensional array preferably should be used, and a plurality of radial arrays is preferred, but any desired array can be used. The outputs of the sensors 16 go by cable 50 through amplifiers 52 to recorder 54. The seismic source and instrumentation are all conventional, and are used in a conventional manner. Any type of source can be used such as, impulsive or vibratory, compressional or shear, etc.

I have shown rays of the seismic waves produced by the source 14, such as 84A which reflects at point 84 and travels upwardly as ray 84B to sensor 16A, and others reflecting at points 86, 87, and 88, etc.

As discussed in connection with FIG. 1, the reflection coefficients at each of the reflection points 84, 86, 87, 88 will depend on the bulk density and seismic velocity of the two formations at the contact plane 32A. Before the recovery operation is started, the rock properties at all points at all radii will be the same. After part of the mineral has been removed, and liquids and gases are present, the reflection coefficients can be quite different, as has been discussed. If the method of production used provides the liquid and gas conditions described, then the reflection coefficient will be different, and at least one parameter of the reflected waves will be different, and this can be found by comparing the electrical signals from the spaced geophones. This will then indicate the boundary between the produced zone A and the part of the formation zone B that remains unchanged. This boundary can be determined to as great a precision as desired by spacing the geophones as close together as necessary.

In the transition or burn zone C the conditions will be different from those in either zones A or B, and there is likely to be a still different character of the reflections and geophone signals from reflecting points in surface 32A at zone C, such as 87A, 87B.

While I only show the possible reflecting points 84, 86, etc. at the top surface of the producing formation, there will also be reflections upward from the lower surface 32B of the formation 32, as illustrated in FIG. 1, and as is well known in the art. When the formation is thin, the upward reflections from the top and bottom surfaces come close together and combine to form a different character of reflection. This is well known in the art.

THE METHOD APPLIED TO DIFFERENT PROBLEMS

A. The case of gas repressuring project

Where hydrocarbon gases are injected through input wells into the formation, there will then be three separate zones A, B, and C as shown in FIG. 2. In zone A the pores will be filled with gas alone, in zone B the pores will be filled with liquid alone, and in zone C there will be liquid and gas. These three physical conditions in the formation will provide three different reflection coefficients and correspondingly, three different reflection characters, which would be evident by comparison of the electrical signals.

Not only is it useful and desirable to compare electrical signals from different sensors for a given operation of the source, but it is useful also to compare electrical signals from a single sensor for different operations of the source, at spaced long time intervals, as the fluid drive progresses.

B. Water drive operations

This is a very common type of field operation for secondary recovery of oil. In this operation certain wells are considered input wells, and others output wells. Water under pressure is injected into the producing formation and flows substantially radially outwardly, driving the oil before it to producing wells.

It would be very desirable to know the precise position of the contact line between the water and the oil. This is important in determining what is happening in the formation. Unfortunately, the acoustic impedance of the producing formation would not be greatly different with water or oil in the pores, so this boundary line cannot readily be determined by the process just described, since the signals from all the sensors would be substantially similar.

However, this invention proposes to inject a gas into the water driving fluid, before it goes to the well. Then, by referring to FIG. 2, zone A would represent the gas saturated water, while zone B would represent the original condition of oil in the pores. And, of course, by the seismic process illustrated by FIG. 2, the boundary zone between the two could be determined.

Of course, if a water flood had been in operation prior to the injection of a gas, the earlier contact would still not be clearly shown. The contact between the plain water drive and gas-water drive should easily be identified.

In another facet of this invention I propose to inject at successive periods of time, different amounts of gas into the water drive. This would include also the complete cut-off of water and substitution of gas for the drive, so that there would be successive bands of water and gas, or water and partial gas saturation in water.

These bands would have to be of substantial dimension, at least as long as 1/10th of the wavelength of the seismic waves recorded. By the use of these bands of varying saturation of gas in the water (from 0 to 100%) then a continuing pattern of the water flow would be observable.

Figure 3:
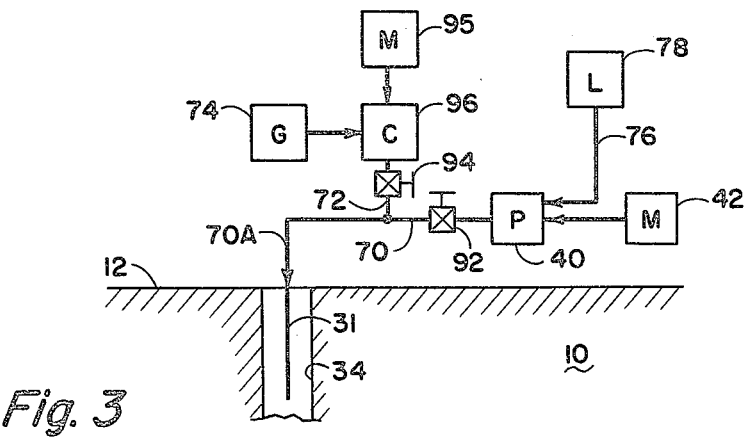
FIG. 3 illustrates to a larger scale and greater detail, part of FIG. 2.

In FIG. 2 and in FIG. 3, to a larger scale with more detail, I show an apparatus for injecting both pressurized liquid and pressurized gas into the formation.

A source of water or other liquid L,78 goes to pump 40, driven by motor 42. The output of the pump 40 goes through valve 92 and pipes 70 and 70A to the injection well 34 and through pipe 31 to the formation. There is a supply of selected gas G,74 that goes to a compressor 96 that is driven by motor 95. The output of compressor 96 goes through valve 94 and line 72 to line 70A to the well. By adjusting pressures of liquid and gas, and valves 92, 94, any desired ratio of gas to liquid can be produced, for injection into the formation.

C. Injection of steam into a viscous oil formation

Outside of the field of shallow tar sands which was fully described in my copending application Ser. No. 41,061, there is a widespread use of steam injection for the production of shallow and deep viscous oil in the pores of a consolidated rock. If the formation is deeper than about 1000–1500 feet, a horizontal fracture cannot be formed, and operation is by a process called "stuff and puff". Steam is injected for a period of hours or days to heat the rock and oil. Then the steam is stopped and pumps are used to produce to condensate liquid, and what oil is heated. Then the injection is started again, and so on. Each heating and producing cycle creates more void space so that the period of injection can be increased each cycle.

In the inner zone A, where oil has been produced (zone A of FIG. 2) there will be mixture of gas and liquid (water and steam). In zone B, where the heat has not penetrated, the pores are filled with viscous oil. In zone C there will be a mixture of gas, thick oil, and water, and so on. Each of these physical conditions should produce reflections of different character, and therefore should become visible by this method.

D. The production of large fractures in the earth

A fracture fluid is pumped into a well and into the formation to be fractured. Since at considerable depth, fractures are generally in a vertical plane, and it is important to know the azimuth of the fracture. This general problem is discussed in my copending application, Ser. No. 226,891.

Since the fracture is vertical (or nearly so) there is very little cross-sectional area from which a vertical reflection can be formed.

What I propose is to inject a gas along with the fracture liquid. This gas will flow through the fracture as it is formed and out into the walls of the fracture, adding gas to the existing oil, and for the purpose of "seeing the fracture" by this seismic method. This flow of gas gives the fracture a much greater effective width for the production of reflections. Since this gas flow would be symmetrical around the borehole, and linear along the fracture, it could clearly define the azimuth of the fracture.

If the formation being fractured is filled with gas, then a low viscosity liquid would be injected as, or with, the fracture fluid.

The gas or liquid injection can be carried out while, or any time after, a fracture is being formed; such as, for example, immediately after the fracture is completed, and before the liquid pumps are removed from the well.

In my copending application, Ser. No. 226,891, I teach a method of fracturing at a much lower than normal fluid pressure, such that a less viscous fracture fluid can be used, which would then provide the effect described above.

The physical phenomena involved in this method as has been described are known and have been utilized in the so-called "bright spot" interpretation of seismic records taken over certain types of geologic structures. However, this invention differs importantly, in that fluid of a certain selected composition is injected into a geologic formation in the earth, so as to create a changed acoustic impedance in that formation, whereby a desired change in one or more properties of the seismic reflection obtainable from that formation is achieved.

In the bright spot method, the seismic reflections obtained from a naturally occurring condition in the earth are interpreted. In this invention, the naturally occurring conditions in the formation are intentionally altered by injecting a fluid of known properties into the formation to provide a different reflection from that formation than existed before the conditions were altered.

So far as the fluid injected is concerned, it must, along with the fluids naturally in the formation, create a situation of a selected gas-liquid saturation. If that condition already exists in the formation, then the fluid injected would be a gas-free liquid. This then provides the contrasting conditions of adjacent areas having high and low reflection coefficients.

Also, the particular fluid being injected for recovery purposes would serve as the fluid injection of this invention, even though its main purpose of injection would be to produce the mineral.

This invention covers any case where a fluid would be injected into an earth formation, for any purpose, and where it is necessary to know where in the formation the fluid lies.

As pointed out above, I contemplate, in the long-term injection of the selected fluid, to vary the composition at selected time intervals. This will provide continuous zones of different reflecting properties. This will provide more information as to the aerial distribution of fluid flow, by variation in the radial width at different points around the band.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. In a mineral recovery program such as for recovering petroleum hydrocarbons from a selected geological formation in the earth; in which at least two spaced boreholes are drilled from the surface into said formation; a first one of said boreholes used for producing the first fluid in said formation, and the second of said boreholes used for injecting a selected second fluid into said formation for the purpose of flooding said formation, and driving said first fluid to, and producing said first fluid from, said first borehole;

the method of monitoring the movement of the boundaries of the zone from which said first fluid has been produced, comprising the steps of:

(a) providing a first selected source of seismic waves at or near the surface at at least one point in the vicinity of the point of injection of said fluid;

(b) positioning at or near the surface of the earth a plurality of seismic sensors at selected known positions, said sensors adapted to receive the upward reflection of downwardly directed seismic waves generated by said source, and to convert them to electrical signals;

(c) selecting said second fluid such that when it is injected into said formation, there will be at least a partial saturation of gas in liquid in said formation;

(c) injecting said second fluid into said formation through said second borehole, while producing said first fluid from said first borehole;

(e) operating said seismic source a first time and recording the first electrical signal from at least two of said sensors; and (f) comparing the first electrical signals from each of said at least two sensors.

2. In a petroleum producing operation in a selected geological formation in the earth, in which at least two spaced-apart boreholes are drilled from the surface to and into said formation; a first fluid being produced from said formation through said first borehole; a second flooding fluid being injected through said second borehole into said formation;

the method of determining the sweep area of said second fluid being injected into said formation as said first fluid is produced, comprising the steps of:

(a) conducting a first seismic survey to obtain a first set of data representing reflections of seismic signals from said formation;

(b) changing the properties of said fluid being injected into said formation, such that the gas saturation in the fluid in said formation, close to said second wellbore will be changed, from a low saturation to a high saturation or from a high saturation to a low saturation and injecting said changed second fluid for a selected period of time;

(c) after said selected period of time, conducting a second seismic survey of said formation; and producing a second set of data representing reflections from said formations; and (d) comparing said first set of data with said second set of data.

3. The method as in claim 2 in which said first fluid is liquid petroleum, and said second fluid is water, and in which said step of change of properties comprises mixing a selected proportion of a selected gas with said water before injection into said formation.

4. The method as in claim 3 and including, after a selected period of injectors, of changing said injection fluid back to water without gas.

5. The method as in claim 2 and including a plurality of producing wells spaced circumferentially about the position of said injection wells.

6. In a petroleum producing operation in a selected geological formation in the earth in which at least two spaced-apart boreholes are drilled from the surface to said formation; a first borehole for the purpose of producing a first fluid from said formation, the second borehole for injecting a driving fluid for pushing said petroleum to said first borehole; the fluid in said formation of high viscosity;

the method of determining the sweep area of said second fluid when injected into said second borehole; comprising the steps of:

(a) if the depth of said formation is shallow enough to be able to produce a horizontal fracture, injecting a selected fracturing fluid into said second borehole and producing a horizontal fracture, in said formation, of radius greater than the distance to said first borehole;

(b) conducting a first seismic survey to obtain a first set of data representing reflections of seismic signals from said formation;

(c) injecting steam of selected properties into said formation through said second borehole, for a selected period of time;

(d) conducting a second seismic survey of said formation; and producing a second set of data representing reflections from said formation; and (e) comparing said first set of data with said second set of data.

7. The method as in claim 1 including the steps of repeating steps (d) and (e) at a later time producing a second electrical signal from each of said sensors; and (g) comparing the second electrical signals from at least said two sensors.

8. The method as in claim 7 including the additional step of:

(h) comparing said first and second electrical signals from at least one of said sensors.

9. The method as in claim 1 in which said step of comparing said electrical signals comprises the step of: determining whether a function of energy of said electrical signals from said sensors is greater from one than from another of said sensors.

10. The method as in claim 1 in which said step of comparing said electrical signals comprises the step of; determining whether the character of said electrical signals from said sensors is different from one than from another of said sensors.

11. The method as in claim 1 in which said seismic source is a source of shear waves.

12. The method as in claim 1 in which said seismic source is a source of transverse shear waves.

13. The method as in claim 8 in which said seismic source is a source of compressional waves.

14. The method as in claim 1 in which said array of geophones is a radial array.

15. The method as in claim 1 in which said formation contains a liquid and said injection fluid is a gas, and including the additional step of injecting a liquid with said gas being injected.

16. The method as in claim 1 in which said formation contains a liquid and said injection fluid is a liquid, and including the additional step of;

adding a gas to said injection liquid before injection; whereby said injected fluid is a mixture of gas and liquid.

17. The method as in claim 1 in which said formation contains a very viscous hydrocarbon, and said injection fluid is steam;

whereby as said formation is heated by said steam the formation will contain a mixture of liquid hydrocarbons, water, and gas.

18. The method as in claim 1 in which said injected fluid is an oxygen-containing gas and said formation contains a mixture of unconsolidated sand and hydrocarbon tar, and including the step of;

igniting said tar so that it continues to burn and heat the remainder of said tar, producing in said formation a mixture of hydrocarbon liquid, water and gas.

19. The method as in claim 1 in which said injected fluid is steam and said formation contains a mixture of unconsolidated sand and hydrocarbon tar, whereby as said formation is heated there will be a zone containing a mixture of hydrocarbon liquid, water and gas.

20. The method as in claim 1 in which the comparison of said electrical signal from at least two of said sensors comprises, comparison of a function of the amplitudes of the reflections from the top interface of said geological formation.

21. The method as in claim 1 in which the comparison of said electrical signal from at least two of said sensors comprises, comparison of a function of the relative phases of the reflection of the reflections from the top interface of said geological formation.

22. The method as in claim 8 in which the comparison of said electrical signals from at least two of said sensors comprises, comparison of the general character of the reflections from the top interface of said geological formation.

23. The method as in claim 1 in which said selected source is one that provides a band of seismic frequencies at or near the upper end of the band of frequencies provided by conventional seismic sources.

24. The method as in claim 1 in which said selected source provides frequencies at least up to 100 Hz.

25. The method as in claim 1 in which said selected source provides frequencies at least up to 200 Hz.

26. The method as in claim 1 in which said selected source provides frequencies at least up to 300 Hz.

27. The method as in claim 16 including the additional step of:

at selected time intervals varying the percentage saturation of gas in the liquid being injected into said formations.

28. The method as in claim 15 including the additional step of:

at selected time intervals varying the proportion of gas and liquid in the injection fluid being injected into said formation.

* * * * *